(12) United States Patent
Kruger et al.

(10) Patent No.: US 6,388,630 B1
(45) Date of Patent: May 14, 2002

(54) WAVEGUIDE FOR TRANSMITTING RF ENERGY THROUGH AN RF BARRIER

(75) Inventors: Johan Dawid Kruger; Christopher Gordon Gervase Turner; Andries Petrus Cronje Fourle; Herman Pieterse, all of Gauteng (ZA)

(73) Assignee: Supersensor (Proprietary) Limited, Gauteng (ZA)

( * ) Notice: Subject to any disclaimer, the term of this patent is extended or adjusted under 35 U.S.C. 154(b) by 0 days.

(21) Appl. No.: 09/624,006

(22) Filed: Jul. 21, 2000

(30) Foreign Application Priority Data

Jul. 22, 1999 (ZA) ............................................... 99/4722
Jan. 27, 2000 (ZA) .......................................... 2000/0360

(51) Int. Cl.⁷ ........................................... G08B 13/187
(52) U.S. Cl. .................. 343/767; 340/572.7; 340/572.1
(58) Field of Search ................................ 343/767, 853, 343/850, 771; 340/572.1, 10.2, 572.7, 693.1, 27; 246/194; 342/44

(56) References Cited

U.S. PATENT DOCUMENTS

| | | | |
|---|---|---|---|
| 4,461,041 A | 7/1984 | Dobrovolny | 455/328 |
| 4,864,258 A | 9/1989 | Garver et al. | 333/20 |
| 4,873,531 A | 10/1989 | Heddebaut | 343/711 |
| 5,262,739 A | 11/1993 | Dalman | 333/26 |
| 5,656,980 A | 8/1997 | Zimmerman | 333/208 |
| 5,717,411 A | 2/1998 | Knop et al. | 343/771 |
| 5,757,329 A | 5/1998 | Hoover et al. | 343/770 |
| 5,781,110 A | 7/1998 | Habeger, Jr. et al. | 340/572 |
| 5,872,485 A | 2/1999 | Ishikawa et al. | 330/286 |
| 6,021,315 A | 2/2000 | Telewski | 455/67.1 |
| 6,054,925 A | 4/2000 | Proctor et al. | 340/572.7 |
| 6,089,512 A * | 7/2000 | Ansorge et al. | 246/194 |
| 6,154,136 A * | 11/2000 | Van Eeden | 340/572.1 |
| 6,184,841 B1 * | 2/2001 | Shober et al. | 343/853 |

OTHER PUBLICATIONS

Christopher Gordon Gervase Turner et al., "Delayed Reset Mode Model Fore Electronic Idenification Systems", Serial No. 09/160,354, filed Sep. 25, 1998.
Johan Dawid Kruger et al., "Electronic Identification System", Serial No. 09/435,467, filed Nov. 8, 1999.
David Edwin Proctor et al., Hybrid Antenna Arrangement For Use With Electronic Identification Systems, Serial No. 09/495,456, filed Feb. 1, 2000.

* cited by examiner

*Primary Examiner*—Don Wong
*Assistant Examiner*—James Clinger
(74) *Attorney, Agent, or Firm*—Finnegan, Henderson, Farabow, Garrett & Dunner, L.L.P.

(57) ABSTRACT

A spacer for items includes a waveguide 28.1 for radio frequency signals and a crate 16.1 or pallet. When items 16.1 to 16.9 in an array are spaced with such waveguides, signals from an interrogator 12 of an RF electronic identification system 10 are guided via the waveguide to transponders 14.1 to 14.9 of the system mounted on the items. Response signals from the transponders are similarly guided in the reverse direction, so that the transponders may be read. The spacer, arrangement and methods according to the invention alleviate the problems presented by an RF barrier in prior art systems.

17 Claims, 6 Drawing Sheets

WAVEGUIDE FOR TRANSMITTING RF ENERGY THROUGH AN RF BARRIER

INTRODUCTION AND BACKGROUND

This invention relates to electronic identification systems. The invention more particularly relates to radio frequency (RF) waveguides associated with spacers, carriers and containers for a plurality of items to be identified and for use with such systems. The invention also relates to an arrangement of items to be identified electronically and associated methods.

Electronic identification systems including an interrogator or reader and a plurality of transponders are well known in the art. In use, the interrogator transmits an RF energizing or interrogation signal towards the transponders to be identified and read. The transponder may utilize the energy in the energizing signal to power local circuits forming part of the transponder. The transponders then respond to the signal by transmitting a response signal including an identification code to the interrogate. The interrogator receives the response signal and reads the identification code. The code read is utilized to identify the transponder and an item or container on which it is mounted.

When the system is used with stacked or otherwise arranged item, the items may form an RF barrier between the interrogator and transponders mounted on the items or other carriers therefor. For example, in one application, crates for carrying containers (cans or bottles) holding a liquid such as a soft drink may each also carry a transponder forming part of the identification system. If these crates are stacked on one another, the containers form an RF barrier through which the energizing signal cannot propagate to energize or interrogate transponders in or on the other side of the barrier. The liquid reflects or absorbs the energy and the metal cans would reflect the energy.

OBJECT OF THE INVENTION

Accordingly, it is an object of the present invention to provide a spacer, an arrangement of items and associated methods with which the applicant believes the aforementioned disadvantages may at least be alleviated.

SUMMARY OF THE INVENTION

According to the invention there is provided a spacer for goods or items including a waveguide for radio frequency waves. The spacer may include a body or in which the waveguide is mounted.

The body may include a carrier for goods such as a pallet. Alternatively, the body may include a container for goods. The container may be a crate.

The waveguide may be a planar waveguide having a characteristic impedance and including spaced first and second walls. The waveguide may comprise an antenna, preferably a slot antenna having an antenna impedance defined by the walls and the characteristic impedance of the waveguide preferably approaches the antenna impedance. This may be achieved by filling the waveguide with a suitable dielectric, such as oil, so that there is better impedance matching than would be the case between the antenna and an air filled waveguide, for example.

However, in preferred embodiments impedance matching means may be provided in the waveguide immediately adjacent the slot antenna. Such impedance matching means may include a quarter wavelength transformer comprising a dielectric material having a suitable relative permittivity. Normally such a material will be a resinous or plastic material. The rest of the waveguide may then be air filled.

A transponder of a radio frequency (RF) electronic identification system may be provided in the waveguide or in a further slot suitably dimensioned and positioned in one of said walls.

The first of said walls may include a peripheral transverse lip formation.

The second of said walls may also include a peripheral transverse lip formation extending away from the lip formation of the first wall, and the slot antenna may be defined between the lip formations.

In the case of a container, the waveguide may be provided in a bottom region of the container alternatively in a top region thereof.

A plastic body of the container may be permanently mounted between the lip formation of the first wall or the lip formation of the second wall. In other embodiments the plastic body may be removably receivable in the lip formation, so that the waveguide actually serves as a carrier or lid for the container.

Also included within the scope of the present invention is an arrangement of separate items, each of at least some of the items including a transponder of a radio frequency identification system, the arrangement including at least one waveguide extending at least partially through the arrangement to guide radio frequency energy between the transponders and a reader of the system. The reader may be located externally of the arrangement.

The items may be arranged in an array having parallel rows and columns.

Yet further included within the scope of the present invention is a method of arranging a plurality of items each including a transponder of a radio frequency electronic identification system, the method including the steps of:

arranging the items in an arrangement; and forming a waveguide for radio frequency energy extending through at least part of the arrangement, to guide radio frequency energy between at least some of the transponders and a reader of the system.

Yet further including within the scope of the present invention is a method of identifying a plurality of items each including a transponder of a radio frequency electronic identification system also including a reader for the transponders, the method including the steps of:

arranging the items in an arrangement;

causing a signal transmitted by the reader to be guided by a waveguide to at least some of the transponders; and causing response signals from the transponder to be guided towards the reader via the waveguide.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
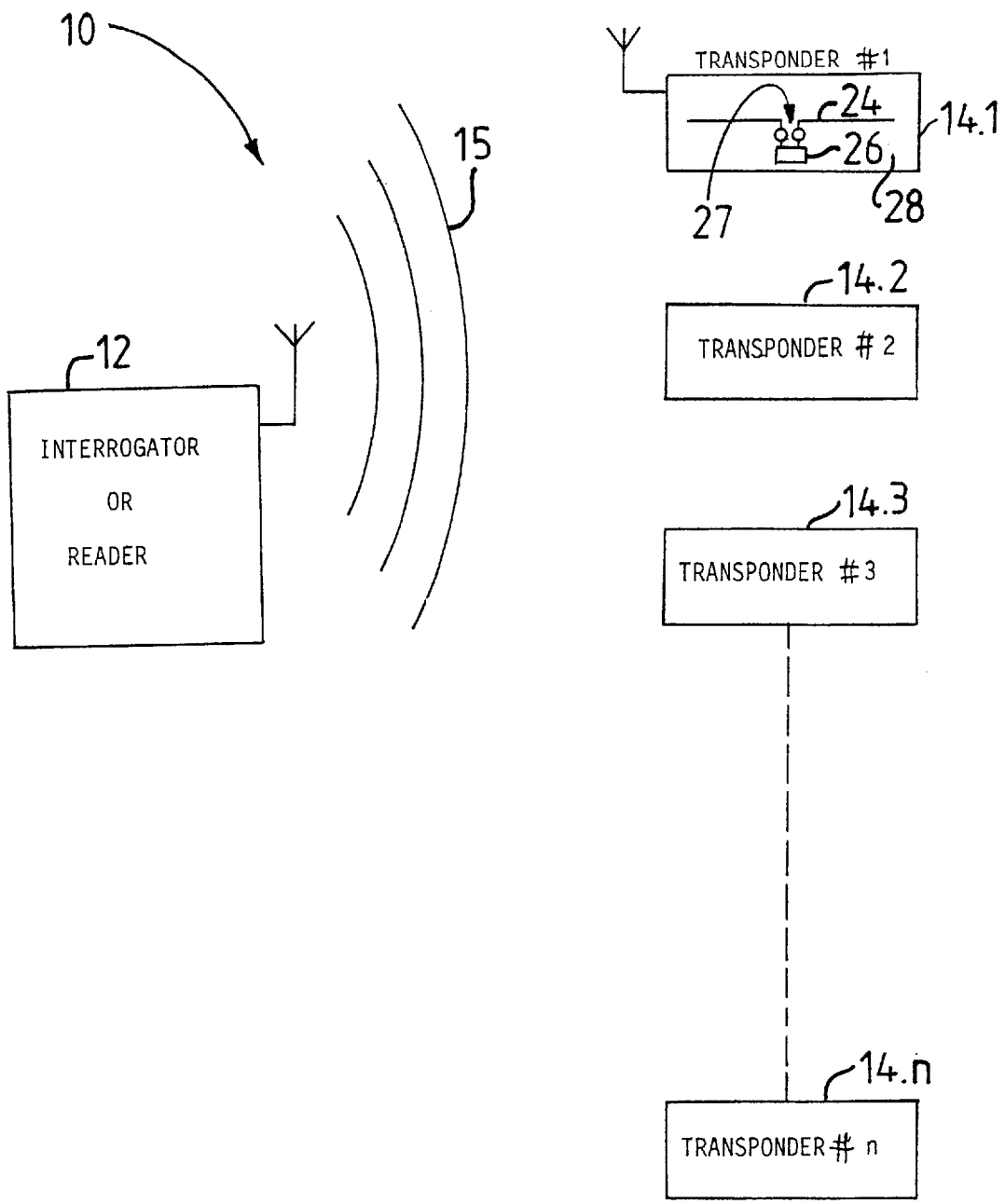
FIG. 1 is a block diagram of a known RF electronic identification system.

A known electronic radio frequency (RF) identification system 10 is shown in FIG. 1.

The system includes an interrogator or reader 12 and a plurality of passive RF transponders 14.1 to 14.n. In use, the transponders are mounted on items or articles, such as crates 16.1 to 16.n (shown in FIG. 2) to be identified, as will hereinafter be described.

The items are identified by causing an RF energizing signal 15 to be transmitted by the interrogator. The frequency of the signal is preferably higher than 100 MHz and typically between 600 MHz and 4 GHz. Each transponder receives the propagating energizing signal, utilizes energy in the signal to power local circuits integrated on chip 26 forming part of the transponder and then responds to the energizing signal by transmitting to the interrogator a response signal including an identification code characteristic of the transponder. The interrogator receives the response signal propagating in the reverse direction and reads the identification code. The code is utilized by the interrogator to identify the transponder and an item on which it is mounted. Although passive transponders utilizing backscatter technology are referred to hereabove, this invention may be used with other passive transponders too, as well as active transponders.

Figure 2:
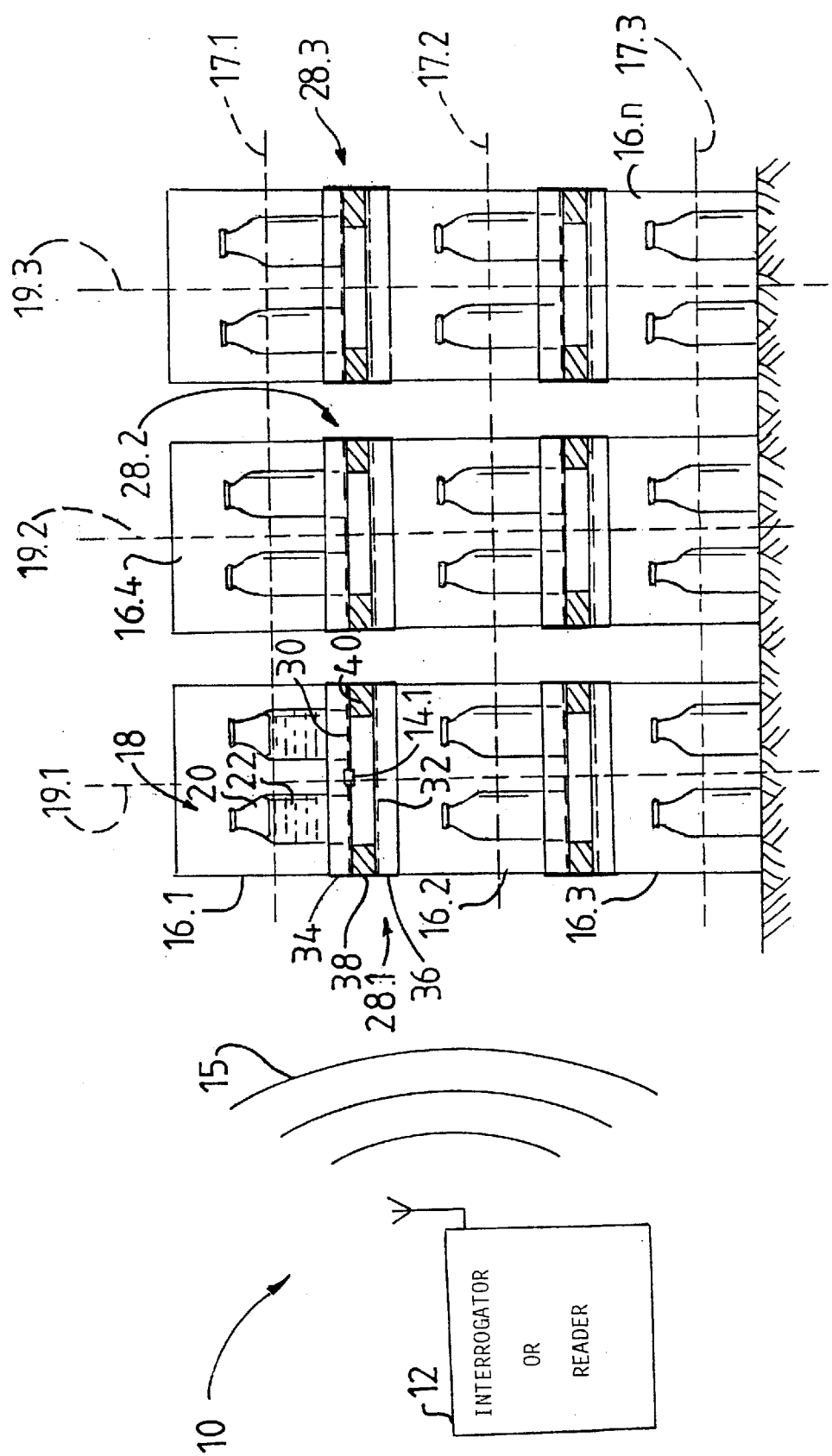
FIG. 2 is diagrammatic side view of a three dimensional array of crates according to the invention stacked and arranged such as to allow propagating radio frequency waves and energy to propagate into and through the array.

As stated hereinbefore and by referring to FIG. 2, the items to be identified may be crates each holding a plurality of containers 20 (such as bottles) filled with a soft drink 22. In conventional systems the transponders such as transponder 14.1 including an antenna 24 and the chip 26 (as shown in FIG. 1) is mounted on a substrate 28, which is mounted in a base region of the conventional crate. Should such conventional crates be stacked on one another in the conventional manner, the liquid in the bottles forms an RF barrier for the energizing or interrogation signal, in that the signal 15 is absorbed by the liquid.

However, as shown in FIG. 2, the crate 16.1 according to the invention, like other known crates, defines a region 18 for receiving goods such as bottles 20. The crate 16.1 also includes a spacer including a waveguide 28.1 for RF signal 15. The waveguide 28.1 is a planar waveguide and includes two parallel metal plates 30 and 32 having peripheral transverse lips 34 and 36 respectively. The lips define a slot antenna 38 (also shown in FIG. 5) having an antenna impedance $Z_A$ wherein $$Z_A = R_A + jX_A; (jX_A \approx 0)$$

$$R_A = (b/a)Z_{ofs}$$

wherein b is the height of the slot 38;

a is the length of the waveguide; and $Z_{ofs}$ is the characteristic impedance of the free space.

Figure 4:
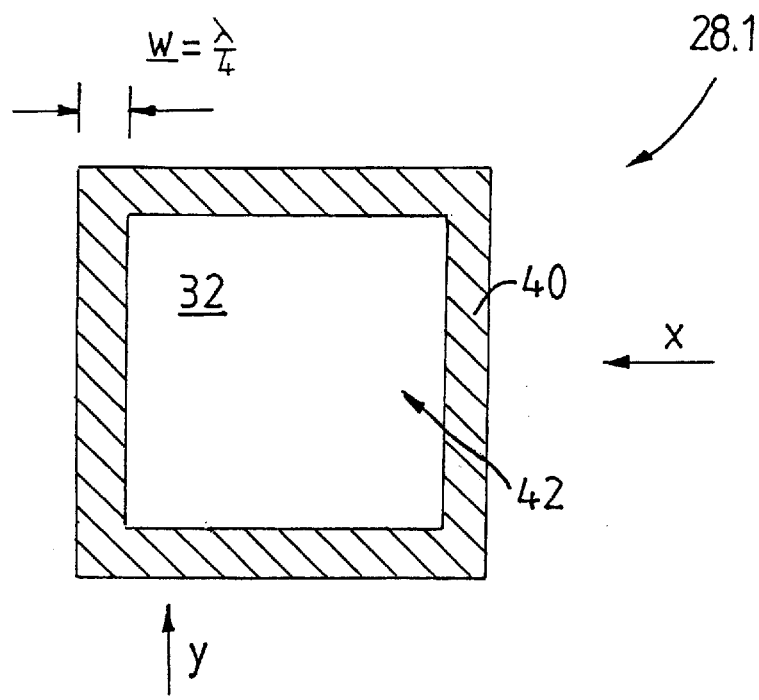
FIG. 4 is a section on line IV in FIG. 3.

The waveguide 28.1 is preferably square so that a and b are the same in both direction X and direction Y shown in FIG. 4. The waveguide 28.1 further includes a quarter wavelength transformer in the form of a body 40 of a dielectric material having a suitable relative permittivity. The body 40 is the form of a square ring (as best shown in FIG. 4) located between plates 30 and 32 and extending along the peripheries thereof. The width w of the body 40 is $\lambda/4$ of the energizing signal 15. The rest 42 of the region between the plates is air-filled. It will be appreciated by those skilled in the art that where the slot antenna impedance approaches the impedance of free space $Z_{ofs}$, the transformer 40 may be dispensed with.

Figure 3:
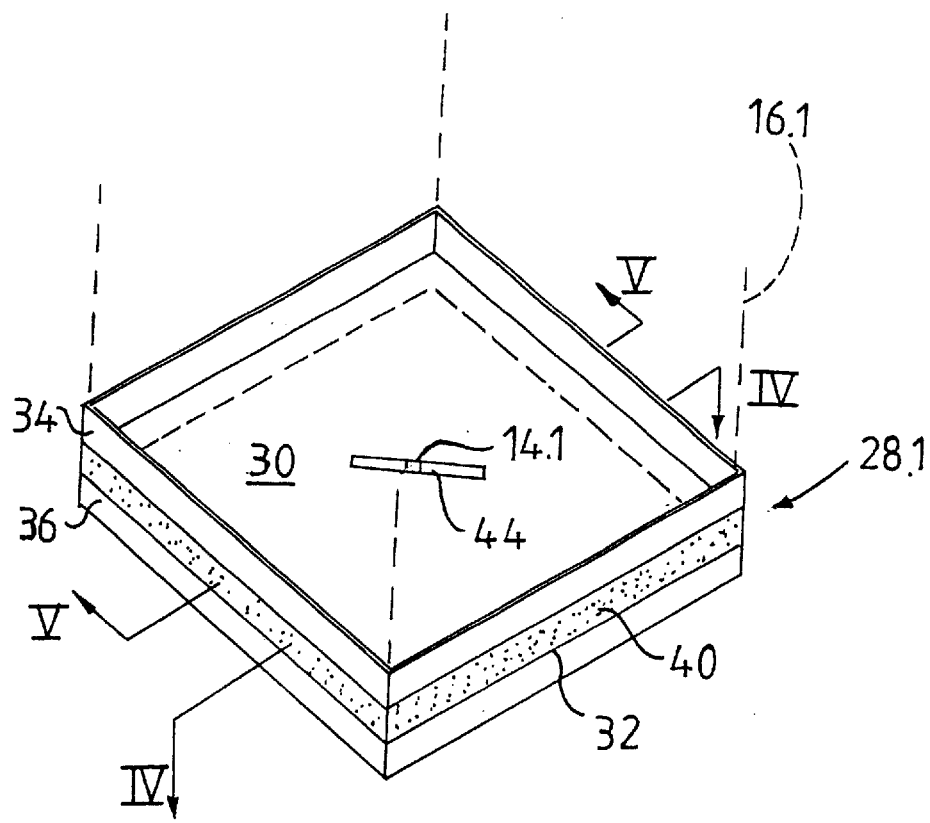
FIG. 3 is diagrammatic perspective view of a waveguide section of the crate.
Figure 5:
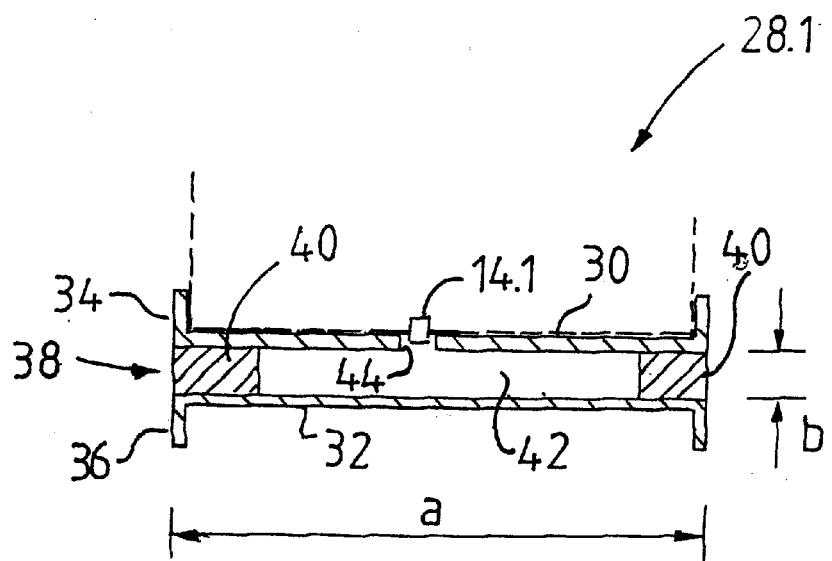
FIG. 5 is a section on line V in FIG. 3.

The transponder 14.1 associated with the crate 16.1 is provided in a diagonally extending slot 44 defined in top plate 30, shown in FIGS. 3 and 5. Such a slot would enable coupling to the transponder from directions X and Y shown in FIG. 4. In other embodiments an input 27 of the chip 26 is electrically connected (galvanically or capacitively) between the top plate 30 and bottom plate 32.

The purpose of the $\lambda/4$ transformer 40 is to improve the matching between the antenna impedance and the characteristic impedance $Z_D$ of the air filled waveguide. Utilizing the formulae $$Z_o = \sqrt{Z_{ofs} \times Z_A}; \text{ and}$$

$$Z_{0\lambda/4} = Z_{ofs}/\sqrt{\epsilon_{r\lambda/4}}$$

wherein $Z_{0\lambda/4}$=the characteristic impedance of the $\lambda/4$ transformer;

$Z_{ofs}$=the characteristic impedance of free space;

$Z_A$=the antenna impedance=$(b/a)Z_{ofs}$; and $\epsilon_{r\lambda/4}$=the relative permittivity of the material of body 40;

it can be seen that by selection of a suitable material for body 40, matching can be obtained.

Referring to FIG. 2, with such matching, the signal 15 will be able to propagate through the waveguide 28.1 to the transponder, such as transponder 14.1, in the slot 44 in FIG. 3. Backscattered energy will also be able to propagate from the transponder, via the waveguide to the reader 12. Furthermore, as the items are arranged in a three-dimensional array of parallel rows 17.1 to 17.3 and columns 19.1 to 19.3 wherein adjacent items in a column are spaced by waveguides, the signals will also be able to propagate through adjacent and similar waveguides 28.2, 28.3 and other waveguides (not shown) extending into the page and which are aligned, so that a transponder on crate 16.4, for example could similarly be read.

Figure 6:
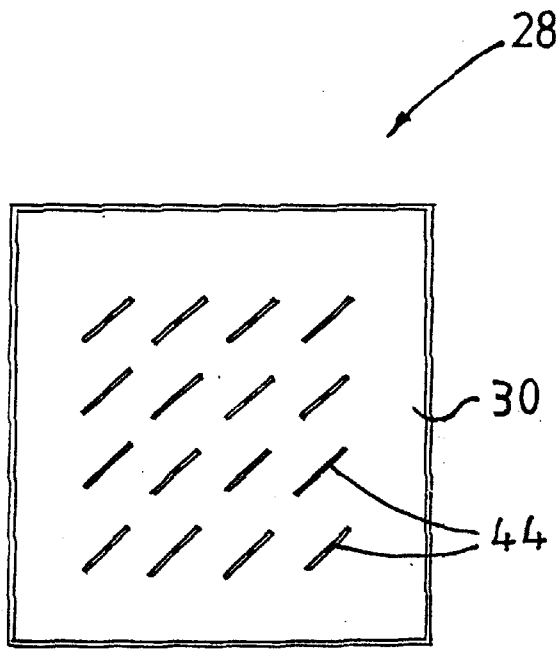
FIG. 6 is a plan view of another embodiment of the waveguide section.

In FIG. 6 there is shown an embodiment of the waveguide 28 wherein a plurality of diagonally extending slots 44 are provided in the top plate 30. These slots serve to leak energy to and from transponders that may be mounted on the bottles 20 as well as, or instead of on the crate as described hereinbefore.

The waveguide may form and integral and permanent part of the crate 16.1. In other embodiments it may be in the form of a base or lid into which a plastic body of the crate is removably and snugly receivable between the transverse lips 34 or lips 36.

Figure 7:
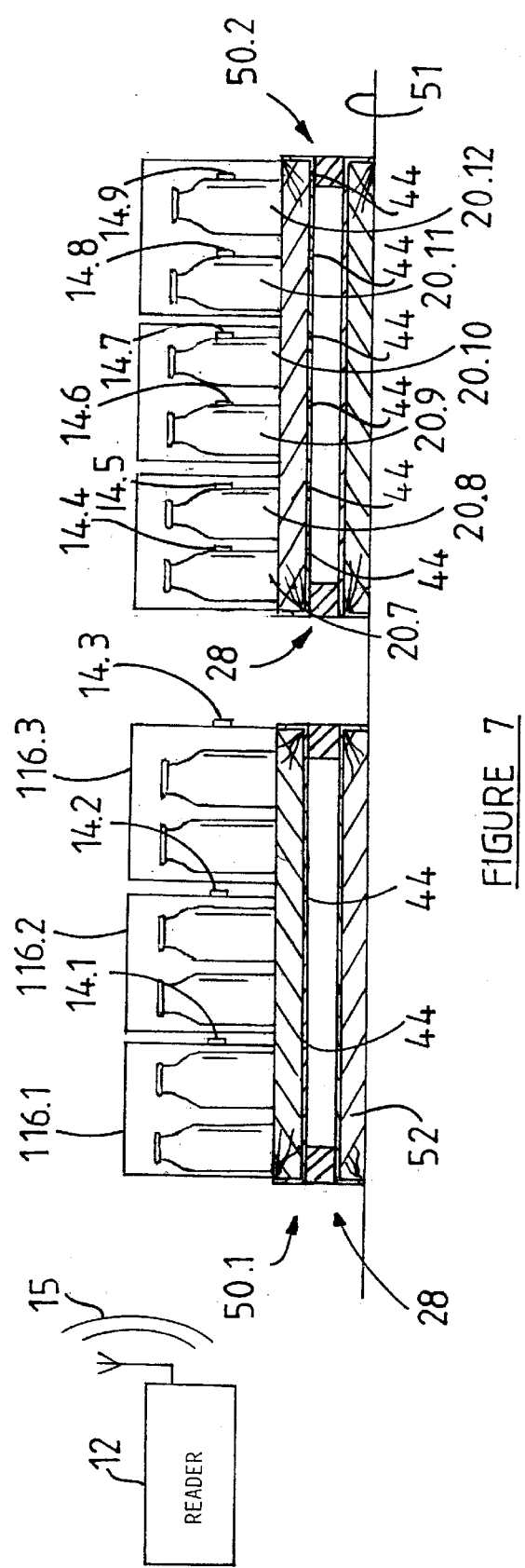
FIG. 7 is a diagrammatic side view, partially in section, of pallets according to the invention.

In FIG. 7 there are shown pallets 50.1 and 50.2 according to the invention supported on a floor 51. Each pallet includes a conventional timber body 52 and a waveguide 28 as hereinbefore described and defined. The waveguide is utilized and enables RF energy 15 from the reader to propagate between the reader 12 and the transponders 14.1 to 14.3 on conventional crates 116.1 to 116.3 respectively.

The pallet 50.2 in FIG. 7 includes a plurality of slots 44 as shown in FIG. 6, for leaking RF energy between transponders 14.4 to 14.9 mounted on the bottles 20.7 to 20.12 and reader 12 as hereinbefore described.

Figure 8:
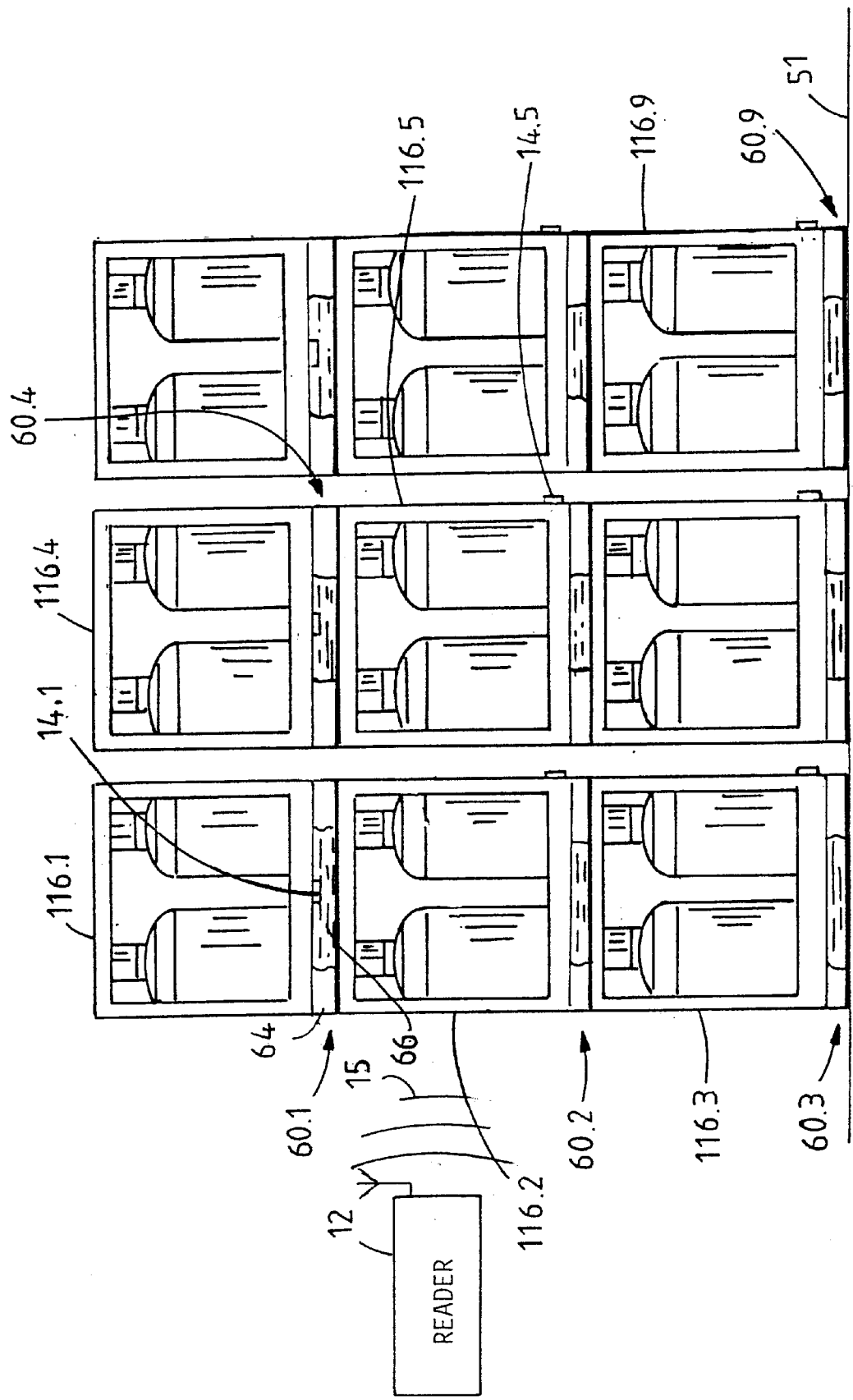
FIG. 8 is a diagrammatic side view of a three dimensional array of crates tacked and arrayed with spacers according to the invention, such as to allow propagating radio frequency waves and energy to propagate through the array.

As shown in FIG. 8, in yet other embodiments the waveguide may form part of a spacer 60.1 to 60.9 or the like for use between two adjacent conventional items, such as conventional crates 116.1 and 116.2. The waveguide may be of the kind and configuration as hereinbefore described. In other embodiments each spacer may include a waveguide in the form of a container 64 of a first dielectric material filled with a second dielectric material 66, such as oil. Furthermore, the transponder may be mounted in the waveguide, as shown in the case of transponder 14.1 and waveguide 60.1. In other cases the transponder may be mounted on the crate, as shown in the case of transponder 14.5 and crate 116.5. Although the spacers are shown between adjacent items in a column, they may also or alternatively be provided between adjacent items in a row.

It will be appreciated that there are many variations in detail on the apparatus and method according to the invention without departing from the scope and spirit of the appended claims.

What is claimed is:

1. A spacer for spacing separate goods relative to one another, the spacer comprising a body comprising a first wall and a second wall spaced therefrom collectively to form an inlet slot and a waveguide for guiding incident radio frequency waves traveling through free space, the waveguide having a characteristic impedance, the space further comprising an impedance matching arrangement for matching an impedance of free space with said characteristic impedance.

2. A spacer as claimed in claim 1 wherein the body comprises a carrier for the goods.

3. A spacer as claimed in claim 1 wherein the body comprises a container for the goods.

4. A spacer as claimed in claim 3, wherein the container is a crate.

5. A spacer as claimed in claim 1 wherein the body comprises a pallet.

6. A spacer as claimed in claim 1 wherein the slot defined between the first wall and the second wall is a slot antenna having an antenna impedance.

7. A spacer as claimed in claim 6 wherein the characteristic impedance of the waveguide matches the antenna impedance.

8. A spacer as claimed in claim 6 wherein the first wall comprises a first transversely extending lip formation, wherein the second wall comprises a second transversely extending lip formation and wherein the slot antenna is defined between the first lip formation and the second lip formation.

9. A spacer as claimed in claim 8 wherein part of the body of the spacer is removably receivable by one of the first and second lip formations.

10. A spacer as claimed in claim 1 wherein the impedance matching arrangement comprises a quarter wavelength transformer comprising a dielectric material.

11. A spacer as claimed in claim 1 comprising a transponder of a radio frequency electronic identification system.

12. An arrangement of separate items, each of at least some of the items comprising a transponder of a radio frequency identification system, the arrangement including at least one waveguide for radio frequency waves extending at least partially through the arrangement, to guide incident radio frequency waves propagating through free space from a reader of the system which is remote from the arrangement to at least partially through the arrangement.

13. An arrangement as claimed in claim 12 wherein the items are arranged in an array having parallel rows and columns and wherein the waveguide is provided between one of adjacent rows and adjacent columns.

14. A method of arranging a plurality of items each including a transponder of a radio frequency electronic identification system, the method including the steps of:

arranging the items in an arrangement; and forming a waveguide for radio frequency waves between adjacent items in the arrangement extending through at least part of the arrangement, to guide radio frequency waves in between the adjacent items in the arrangement.

15. A method of identifying a plurality of items each comprising a transponder of a radio frequency electronic identification system also including a reader for the transponders, the method including the steps of:

arranging the items in an arrangement;

causing an incident radio frequency signal transmitted by the reader which is remote from the arrangement to be guided by a waveguide extending through at least part of the arrangement to at least some of the transponders in the arrangement; and causing response signals from the at least some of the transponders to be guided towards the reader via the waveguide.

16. A spacer for spacing first and second goods, the spacer comprising a body comprising a first wall and a second wall spaced from the first wall and facing the first wall collectively to form between mutually facing inner surfaces of the first wall and the second wall, an inlet for radio frequency waves and a waveguide for the radio frequency waves for guiding the radio frequency waves in between first goods adjacent an outer surface of the first wall and second goods adjacent an outer surface of the second wall.

17. A spacer as claimed in claim 16 wherein the waveguide has a characteristic impedance and wherein the spacer further comprises an impedance matching arrangement for matching an impedance of free space with said characteristic impedance.

* * * * *